United States Patent
Patel et al.

(10) Patent No.: US 6,894,454 B2
(45) Date of Patent: May 17, 2005

(54) POSITION SENSORLESS CONTROL ALGORITHM FOR AC MACHINE

(75) Inventors: Nitinkumar R. Patel, Cypress, CA (US); Steven E. Schulz, Torrance, CA (US); James M. Nagashima, Cerritos, CA (US); Seung Ki Sul, Seoul (KR); Yo-Chan Son, Seoul (KR); Bon-Ho Bae, Seoul (KR)

(73) Assignee: General Motors Corporation, Detroit, MI (US)

( * ) Notice: Subject to any disclaimer, the term of this patent is extended or adjusted under 35 U.S.C. 154(b) by 200 days.

(21) Appl. No.: 10/268,503

(22) Filed: Oct. 10, 2002

(65) Prior Publication Data

US 2004/0070362 A1 Apr. 15, 2004

(51) Int. Cl.[7] .................................................. H02P 1/46
(52) U.S. Cl. ...................... 318/700; 318/701; 318/254; 318/138; 318/439
(58) Field of Search ................................ 318/700, 701, 318/254, 138, 439

(56) References Cited

U.S. PATENT DOCUMENTS

| | | | |
|---|---|---|---|
| 4,814,677 A | 3/1989 | Plunkett | 318/254 |
| 5,144,564 A | 9/1992 | Naidu et al. | 364/494 |
| 5,254,914 A * | 10/1993 | Dunfield et al. | 318/254 |
| 5,559,419 A | 9/1996 | Jansen et al. | 318/808 |
| 5,565,752 A | 10/1996 | Jansen et al. | 318/807 |
| 5,569,990 A * | 10/1996 | Dunfield | 318/254 |
| 5,585,709 A | 12/1996 | Jansen et al. | 318/807 |
| 5,691,591 A * | 11/1997 | McCann | 310/198 |
| 5,886,498 A | 3/1999 | Sul et al. | 318/821 |
| 6,137,258 A | 10/2000 | Jansen | 318/802 |
| 6,291,949 B1 * | 9/2001 | Green | 318/254 |
| 6,388,420 B1 * | 5/2002 | Jansen et al. | 318/799 |
| 6,639,380 B2 * | 10/2003 | Sul et al. | 318/727 |
| 6,650,082 B1 * | 11/2003 | Du | 318/701 |

* cited by examiner

*Primary Examiner*—Rina Duda
(74) *Attorney, Agent, or Firm*—Christopher DeVries

(57) ABSTRACT

A control system for an electric motor including an inverter for providing power to the electric motor, a controller for controlling the inverter, a first motor speed control block in the controller injecting a high frequency signal into the electric motor to determine the speed and position of the electric motor, a second motor speed control block in the controller detecting the back electromotive force to determine the speed and position of the electric motor, and a transition control block in said controller to vary operation between the first motor speed control block and the second motor speed control block.

19 Claims, 4 Drawing Sheets

US 6,894,454 B2

POSITION SENSORLESS CONTROL ALGORITHM FOR AC MACHINE

TECHNICAL FIELD

The present invention relates to the control of electric motors. More specifically, the present invention relates to a method and apparatus for position sensorless control of an electric motor.

BACKGROUND OF THE INVENTION

Traditional motor control systems normally include a feedback device or position sensor such as a resolver or encoder to provide speed and position information for a motor. Feedback devices and associated interface circuits increase the costs of a motor control system, and these costs may become prohibitive in high volume applications such as automotive applications. Additionally, a position sensor and its associated wiring harness increase the complexity and assembly time of an electric drive system in a vehicle.

Electric vehicles powered by fuel cells, batteries and hybrid systems that include electric motors are becoming more common in the automotive market. As production volumes for electric vehicles increase, the cost of feedback devices and associated interface circuits will become significant. Automakers are under intense market pressure to cut costs and reduce the number of parts for a vehicle. The removal of a feedback device for an electric motor control system will lead to significant cost reductions for an electric vehicle.

Hybrid electric and electric vehicles today utilize numerous electric motor control technologies such as the vector control of electric motors. A vector motor control scheme is a computationally intensive motor control scheme that maps the phase voltages/currents of a three-phase motor into a two axis coordinate system. The structure used to excite an electric motor using a vector control scheme is a typical three-phase power source inverter including six power transistors that shape the output voltage to an electric motor. Vector control requires rotor position information, which is normally obtained via a feedback device or position sensor. The objective of the position sensorless control is to obtain the rotor position information utilizing electromagnetic characteristics of an AC machine, eliminating the position sensor and its associated interface circuits.

SUMMARY OF THE INVENTION

The present invention is a method and apparatus for a sensorless control system used in electric and hybrid electric vehicle powertrain applications. The motor control system of the present invention preferably utilizes spatial variation of machine inductance that results from a high frequency signal injection at a relatively low speed (<10% of rated machine speed) and a back electromotive force (EMF) of an AC machine at a relatively high speed (>5% of rated machine speed). While machine speed range limits have been described with reference to a low speed and high speed, it is considered within the scope of the present invention to utilize the spatial variation and back EMF-based methods of the present invention at any speed of an electric motor.

The present system further includes an initial rotor polarity detection method used to detect the polarity of the rotor magnet during static and dynamic conditions. The present invention will work over the entire torque/speed operating plane, including a standstill and zero stator frequency conditions. The low-speed feedback observer tracks the absolute difference between the D- and Q-axis high frequency impedances to avoid sensitivity to generated harmonics during the stator current transients. At high speed, the present invention uses a full order closed loop speed observer. The rotor speed for the high speed tracking is estimated using a proportional-integral (PI) type controller. The closed form of this observer makes it less sensitive to the parameter variations and allows faster dynamic performance. A transition algorithm provides high level control to supervise the operation of the low- and high-speed sensorless control methods/observers of the present invention.

DESCRIPTION OF THE PREFERRED EMBODIMENT

Figure 1:
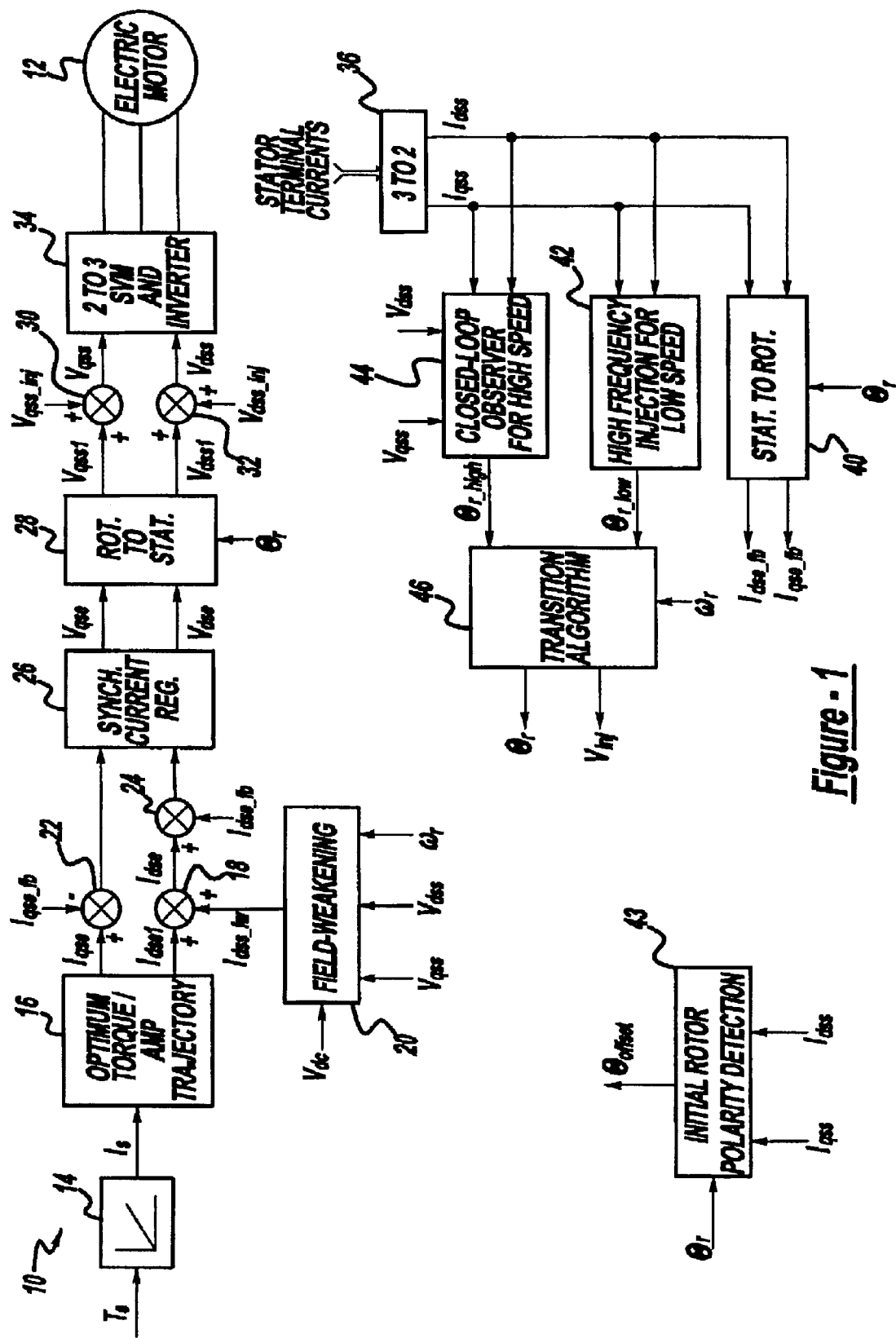
FIG. 1 is a block diagram of a control system in the present invention.

FIG. 1 is a diagrammatic drawing of a preferred embodiment of a control system 10 of the present invention. The control system 10 is illustrated as a sequence of block diagrams that represent software executed in a controller, microprocessor, or similar device to control an electric motor 12. In the preferred embodiment of the present invention, the controller is a vehicle powertrain controller controlling the electric motor 12, but any other motor control application is considered within the scope of the present invention. The electric motor may comprise motor technologies such as synchronous reluctance motors, induction motors and interior permanent magnet motors. The input to the control system is a torque command $T_e$ generated by the vehicle controller. The torque command $T_e$ is processed by a torque linearization model 14 to generate a corresponding stator current $I_s$ required to develop the desired electromagnetic torque in the motor 12. The stator current generated at bock 14 is then passed to an optimum torque per amp block 16. Block 16 processes the commanded stator current and decomposes it into the respective D and Q axis components of current command ($I_{dse1}$ and $I_{qse}$) to provide the maximum torque for the given stator current amplitude.

The current command $I_{dse1}$ is added to a field weakening component $I_{dse\_fw}$ generated at summing junction 18 to generate the final D axis current command $I_{dse}$. The field weakening component $I_{dse\_fw}$ is generated by a field weakening block 20 using the measured DC link voltage $V_{dc}$, commanded output voltages $V_{qss}$ and $V_{dss}$, and rotor angular velocity $\omega_r$. Summing junction 22 subtracts the feedback current $I_{qse\_fb}$ from the Q axis current command $I_{qse}$ to obtain the error of the Q axis current regulator. Summing junction 24 subtracts the feedback current from $I_{dse\_fb}$ from the D axis current command $I_{dse}$ to obtain the error of the D axis current regulator. The errors generated by the summing junctions 22 and 24 are used by a synchronous current regulator block 26 to control the synchronous frame voltage commands $V_{dse}$ and $V_{qse}$.

Block 28 uses the estimated rotor angular position $\theta_r$ to convert the synchronous frame voltage commands $V_{dse}$ and $V_{qse}$ to the stationary frame voltage commands $V_{dss1}$ and $V_{qss1}$. The high frequency voltage signals $V_{dss\_inj}$ and $V_{qss\_inj}$ are added to the stationary reference frame voltage commands by the summing junctions 30 and 32, resulting in the final voltage commands $V_{dss}$ and $V_{qss}$. The voltage source inverter 34 processes the final voltage commands $V_{dss}$ and $V_{qss}$ to generate the actual phase voltages applied to the motor 12. The phase currents are measured and processed by a three-phase to two-phase transformation block 36. The outputs of the block 36 are stationary frame currents $I_{dss}$ and $I_{qss}$. A stationary to rotating frame transformation block 40 uses the stationary frame currents $I_{dss}$ and $I_{qss}$ and the estimated rotor angular position $\theta_r$ to generate synchronous reference frame feedback currents $I_{dse\_fb}$ and $I_{qse\_fb}$.

The present invention includes sensorless control of the rotor speed and position that includes: a low-speed rotor angular position estimation method/observer at block 42; an initial rotor polarity detection method at block 43; a high speed rotor angular position estimation method/observer at block 44; and a transition algorithm at block 46 to seamlessly merge the low- and high-speed estimation methods.

Figure 2:
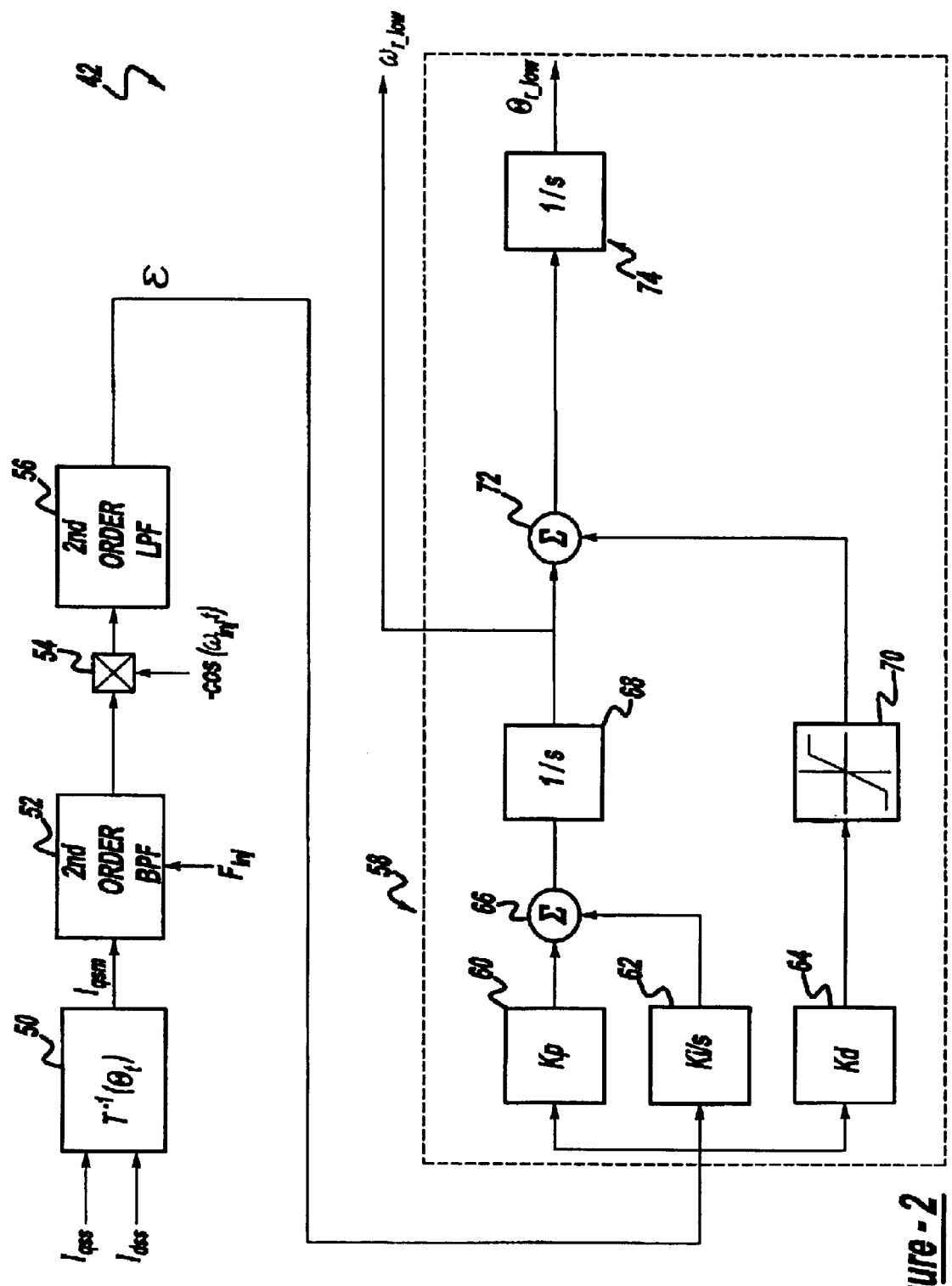
FIG. 2 is a block diagram of the low-speed rotor electrical speed/position estimation method of the present invention.

Block 42 of FIG. 1 represents the low-speed estimation method of the present invention. FIG. 2 shows a detailed block diagram implementation of block 42 to estimate rotor electrical position during low-speed operations as described above. The low-speed estimation method is used to estimate rotor electrical position during zero and low-speed operations (preferably <10% of rated machine speed but any machine speed is considered within the scope of the low-speed estimation method of the present invention). The estimation of the rotor electrical position is performed by injecting a high frequency voltage signal on an estimated D axis of the machine. The fluctuating high frequency signal in a synchronously rotating reference frame with the fundamental stator frequency is used to detect an asymmetry of the spatial impedance in an AC machine. An asymmetry of the spatial impedance is caused by salient construction of the rotor of the machine or induced magnetic saturation in the machine.

If the high frequency voltage signal is injected on the estimated D axis, the orthogonal component of the current measured at the estimated reference frame can be used as an error signal as shown by equation (1).

$$\begin{pmatrix} i_{dsi}^m \\ i_{qsi}^m \end{pmatrix} = \begin{pmatrix} y_{avg} + y_{diff}\cos2\theta_{err} & -y_{diff}\sin2\theta_{err} \\ -y_{diff}\sin2\theta_{err} & y_{avg} - y_{diff}\cos2\theta_{err} \end{pmatrix} \begin{pmatrix} v_{dsi}^m \\ v_{qsi}^m \end{pmatrix} \quad (1)$$

where $y_{avg}=(z_q^e+z_d^e)/2z_d^e z_q^e$ and $y_{diff}=(z_q^e-z_d^e)/2z_d^e z_q^e$. If the voltage signal is injected on the estimated D-axis ($v_{dst}^m = V_{inj}\sin\omega_t$ and $v_{qst}^m=0$), then in the Q-axis current signal the diagonal component disappears and the off-diagonal component appears as shown in equation (2). If resistive components are much smaller than inductive components ($r_d^e$, $r_q^e << x_d^e, x_q^e$) at the high frequency and also the impedance difference of the reactive component is much larger than that of the resistive component ($|x_d^e - x_q^e| >> |r_d^e - r_q^e|$), then equation (2) can be simplified as shown in equation (3) in quasi-steady-state.

$$i_{qsi}^m = (-y_{diff}\sin2\theta_{err}) \cdot V_{inj}\sin\omega_h t = \left[\frac{(r_d^e - r_q^e) + j(x_d^e - x_q^e)}{(r_d^e + jx_d^e) \cdot (r_q^e + jx_q^e)}\right] \cdot \quad (2)$$

$$(V_{inj}\sin2\theta_{err}) \cdot \sin\omega_h t$$

$$i_{qsi}^m \approx -j\frac{x_d^e - x_q^e}{x_d^e x_q^e} \cdot (V_{inj}\sin2\theta_{err}) \cdot \sin\omega_h t = -\frac{x_d^e - x_q^e}{x_d^e x_q^e} \cdot \quad (3)$$

$$(V_{inj}\sin2\theta_{err}) \cdot \cos\omega_h t$$

Multiplying the orthogonal signal with respect to the injected signal results in the DC quantity of the error signal for the tracking controller. After low-pass filtering, the DC quantity can be obtained as shown in equation (4).

$$\varepsilon = LPF[i_{qsi}^m \times (-\cos\omega_h t)] = -\frac{Y_2}{2}\sin2\theta_{err} \approx -Y_2\theta_{err} \quad (4)$$

where $Y_2 = -\frac{x_d^e - x_q^e}{x_d^e x_q^e}$.

Referring to FIG. 2, block 50 converts the stationary frame currents $I_{qss}$ and $I_{dss}$ to the estimated synchronous reference frame current $I_{qsm}$. Block 52 comprises a second order band pass filter to allow only the injection high frequency signal (preferably in the range 300 to 1000 Hz) to be processed at multiplying junction 54. Junction 54 multiplies the output of the BPF of block 52 by the term $-\cos(\omega_{inj}t)$ to extract the DC component of the error signal. Block 56 comprises a second order low pass filter to remove high frequency harmonics from the signal and output the term $\varepsilon$. $\varepsilon$ is an error signal defined in equation (4).

Block 58 is a third order position observer that processes the error term $\varepsilon$. $\varepsilon$ is processed by proportional control block 60, integral control block 62, and feed-forward control block 64 to generate outputs. The integral and proportional outputs of blocks 60 and 62 are summed at summing junction 66 and processed by block 68 to generate and estimate speed $\omega_{r\_low}$. The output of the feed-forward gain block 64 is processed by a limiter block 70 and then fed forward to summing junction 72 to be added to the speed output of block 68. Block 74 processes the output of summing junction 72 to generate the term $\theta_{r\_low}$ which is the estimated angular position of the rotor at low speed.

Figure 3:
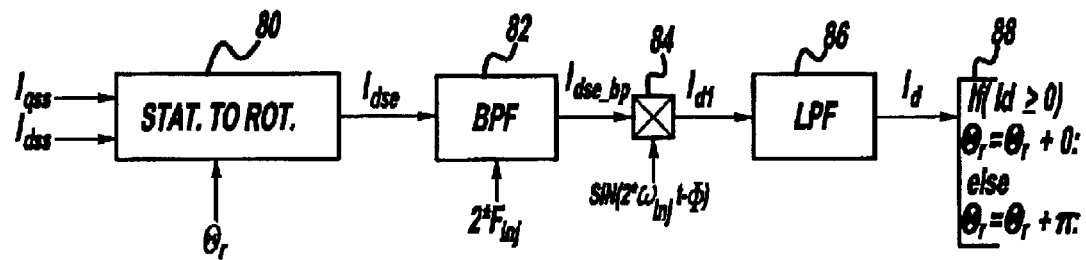
FIG. 3 is a block diagram of the initial polarity detection method of the present invention.

FIG. 3 is a detailed block diagram implementation of the block 43 used to detect initial rotor magnet polarity. The stationary to rotating reference frame block 80 converts the stationary frame currents $I_{dss}$ and $I_{qss}$ to the synchronous reference frame currents $I_{dse}$ and $I_{qse}$ using $\theta r$. Only the D axis current $I_{dse}$ is used in the initial rotor polarity detection method. $I_{dse}$ is passed through a band-pass filter 82 which filters out all but the second harmonic of the injection frequency of the $I_{dse}$ current. The output of the band-pass filter 82 is $I_{dse\_bp}$. The signal $I_{dse\_bp}$ is demodulated by multiplying it with the term $\sin(2\omega_{inj}t-\phi)$ using the multiplier block 84. The resultant signal $I_{d1}$ will contain a DC component and a high frequency component. The low-pass filter block 86 filters out the high frequency component of $I_{d1}$, leaving only the DC portion $I_d$. The signal $I_d$ contains the information on the polarity of the rotor magnet with respect to the estimated machine D axis. Condition block 88 determines the polarity of the estimated position using the sign of the signal $I_d$. This condition may be evaluated only once during the start-up sequence. If the sign of $I_d$ is negative, 180 degrees is added to the estimated rotor position.

Figure 4:
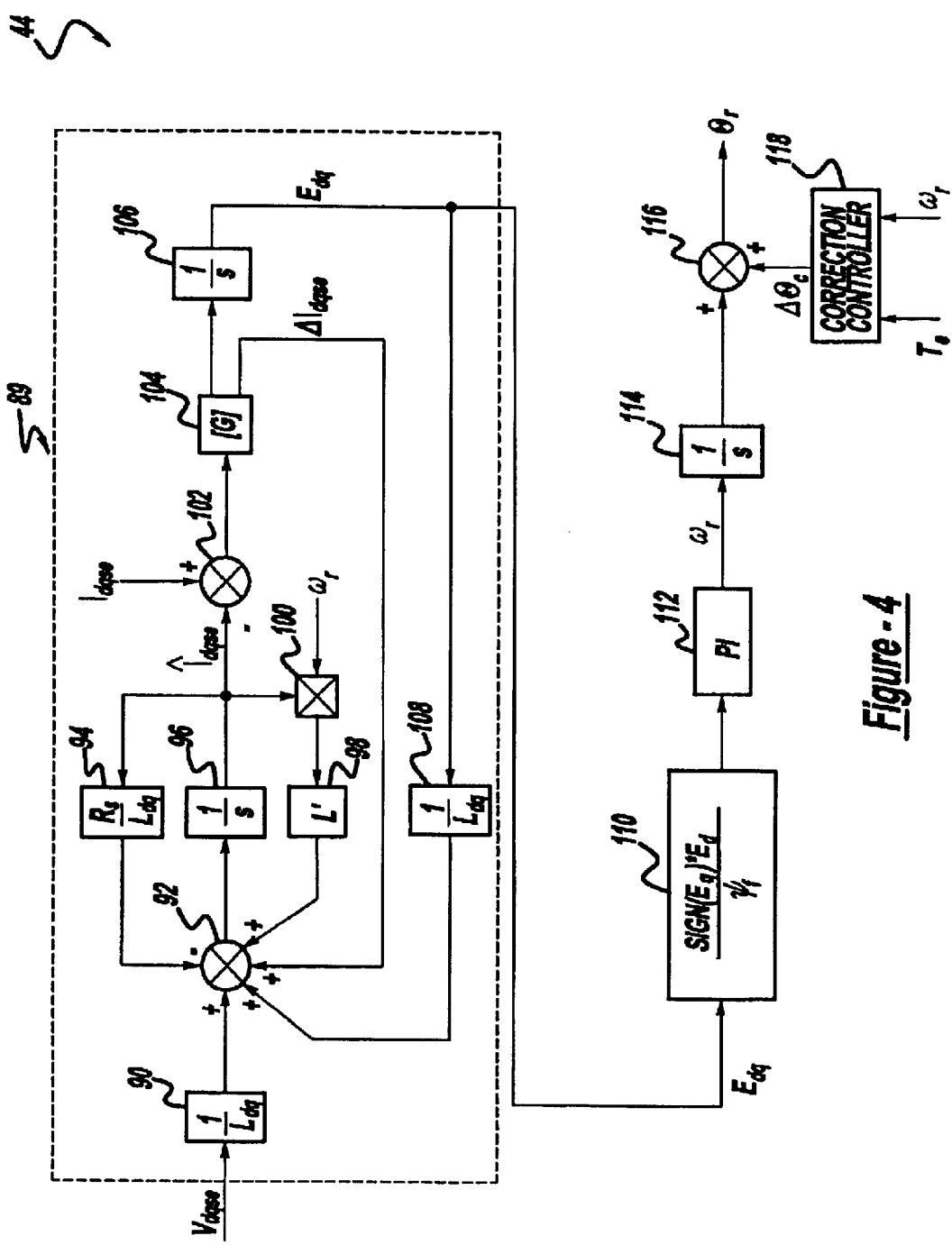
FIG. 4 is a block diagram of the high speed rotor electrical speed/position estimation method of the present invention.

FIG. 4 is a detailed block diagram implementation of the high speed estimation method of block 44 seen in FIG. 1. Block 89 is an estimator for the D and Q axis BEMF voltages $E_{dq}$ using measured synchronous frame currents $I_{dqse}$ and commanded synchronous frame voltages $V_{dqse}$. Commanded voltages $V_{dqse}$ are multiplied by block 90, which represents the matrix "B" in the following Equation 5. Blocks 94, 98, and 108 represent the matrix "A" in Equation 5. The output of summing junction 92 is integrated by block 96 resulting in an estimated synchronous reference frame currents $I_{dqse\_hat}$. The output of integrator block 96 is supplied to block 94, junction 100, and block 102. Multiplier junction 100 multiplies the output of block 96 by the estimated angular rotor speed $\omega_r$ and supplies its output to block 98. Summing junction 102 compares measured and estimated currents to generate an error signal, which is in turn supplied to block 104. Block 104 is a gain matrix representing matrix "G" in Equation 5. Block 106 integrates the output of 104 to generate estimated D and Q axis BEMF voltages. Summing junction 92 adds the outputs of blocks 90, 94, 98, 104, and 108 to complete state matrix "x" in Equation 5.

A closed loop full state observer of block 89 can be expressed by the following equation:

$$\hat{x} = A\hat{x} + Bu + G(y - C\hat{x}) \quad (5)$$

where $\hat{x} = \begin{bmatrix} \hat{i}_{dse} & \hat{i}_{qse} & \hat{E}_d & \hat{E}_q \end{bmatrix}^T$, $y = \begin{bmatrix} i_{dse} & i_{qse} \end{bmatrix}^T$, $$A = \begin{bmatrix} -\frac{r_s}{L_d} & \omega_r \frac{L_q}{L_d} & \frac{1}{L_d} & 0 \\ -\omega_r \frac{L_d}{L_q} & -\frac{r_s}{L_q} & 0 & \frac{1}{L_q} \\ 0 & 0 & 0 & 0 \\ 0 & 0 & 0 & 0 \end{bmatrix}, B = \begin{bmatrix} \frac{1}{L_d} & 0 \\ 0 & \frac{1}{L_q} \\ 0 & 0 \\ 0 & 0 \end{bmatrix},$$

$$C = \begin{bmatrix} 1 & 0 & 0 & 0 \\ 0 & 1 & 0 & 0 \end{bmatrix}, G = \begin{bmatrix} g_{11} & g_{12} \\ g_{21} & g_{22} \\ g_{31} & g_{32} \\ g_{41} & g_{42} \end{bmatrix}$$

Estimated back EMF $E_{dq}$ is used to generate the speed and rotor electrical position using blocks 110–118. Block 110 is used to generate the proper scaling and polarity of the error signal to the PI block 112. If the estimate is correct, $E_d$ is equal to zero. However, if $E_d$ is non-zero, then it can be used as the error signal to the PI block 112, resulting in an estimated rotor angular velocity $\omega_r$. Integrator block 114 generates the estimated rotor position $\theta_r$ based on the estimated rotor angular velocity $\omega_r$. Rotor electrical position correction controller 118 is used to compensate any error in the estimate due to the non-linearity of the system through summing junction 116.

Figure 5:
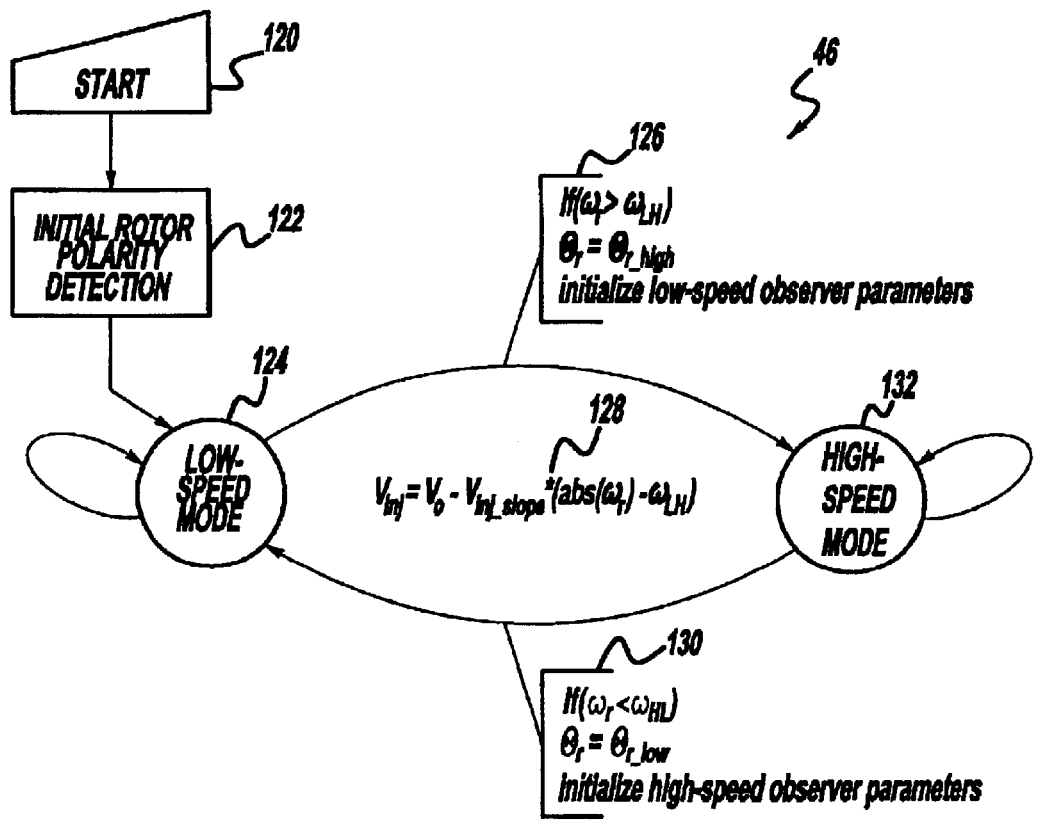
FIG. 5 is a state diagram of the transition method of the present invention.

FIG. 5 illustrates a state flow diagram for the transition method block 46 of the present invention that provides for a smooth transition between high- and low-speed rotor angular position and speed estimation methods. The transition algorithm described in FIG. 5 provides high level control to supervise the operation of the low- and high-speed sensorless control methods. Upon power-up of the controller, the algorithm begins with the start module 120, which performs general initialization functions. In the case of a permanent magnet machine, block 122 is used to determine the initial polarity of the rotor magnet (i.e., north/south orientation). Once the initial rotor polarity detection is complete, the algorithm enters a low-speed mode 124, and remains there until the conditions described in condition block 126 have been satisfied. When the condition block 126 becomes true, the control is passed to the high-speed mode 132. Control remains in the high-speed mode until the conditions described in condition block 130 have been satisfied. When the condition block 130 becomes true, the control is returned to the low-speed mode 124. The threshold speeds $\omega_{LH}$ and $\omega_{HL}$ are chosen with sufficient separation to prevent multiple transitioning back and forth between modes. The injection voltage magnitude at block 128 is programmed as a function of rotor speed. At low-speed, the injection voltage is held constant. If speed exceeds a predefined threshold, the injection voltage is reduced linearly with respect to speed. The injection voltage is clamped to zero during high-speed mode.

It is to be understood that the invention is not limited to the exact construction illustrated and described above, but that various changes and modifications may be made without departing from the spirit and scope of the invention as defined in the following claims.

What is claimed is:

1. A control system for an electric motor comprising:
    an inverter for providing power to the electric motor;
    a controller for controlling said inverter;
    a first motor speed control block in said controller injecting a high frequency signal into said electric motor to determine the speed and position of the electric motor;
    a second motor speed control block in said controller detecting the back electromotive force to determine the speed and position of the electric motor; and
    a transition control block in said controller to vary operation between said first motor speed control block and said second motor speed control block.

2. The control system of claim 1 wherein said electric motor is an induction motor.

3. The control system of claim 1 wherein said electric motor is an interior permanent magnet motor.

4. The control system of claim 1 wherein said electric motor is a synchronous reluctance motor.

5. The control system of claim 1 wherein said electric motor is a three-phase motor.

6. The control system of claim 1 wherein said injected high frequency signal is in the range of substantially 300–1000 Hz.

7. The control system of claim 1 wherein said transition block operates said first motor speed control block below ten percent of rated machine speed.

8. The control system of claim 1 wherein said transition block operates said second motor control speed above five percent of rated machine speed.

9. A method of controlling an electric motor comprising:
    injecting a high frequency signal into said motor at a first speed;
    processing feedback generated by the injected high frequency signal to determine the position of a rotor in the electric motor at the first speed;
    determining the speed of the electric motor; and
    determining the position of the rotor in the electric motor based on back electromotive force at a second speed.

10. The method of claim 9 further comprising the step of transitioning between processing the feedback generated by the injected high frequency signal to determine the position of the rotor at a first speed and determining the position of the rotor based on back electromotive force at a second speed.

11. The method of claim 10 further comprising the step of determining the rotor position of the electric motor in a static state.

12. A powertrain for a vehicle comprising:
    an electric motor functionally coupled to at least one wheel in the vehicle;

an inverter electrically coupled to said electric motor;

a DC voltage source electrically coupled to said inverter;

a controller for controlling the output of said inverter to provide electrical current to said electric motor;

a first motor control module in said controller injecting a high frequency signal into said electric motor to determine the speed and position of the electric motor;

a second motor control module in said controller detecting the back electro-motive force to determine the speed and position of the electric motor; and a transition control module in said controller to vary operation between said first motor control module and said second motor control module based upon motor speed.

13. The powertrain of claim 12 wherein said electric motor is an induction motor.

14. The powertrain of claim 12 wherein said electric motor is an interior permanent magnet motor.

15. The powertrain of claim 12 wherein said electric motor is a synchronous reluctance motor.

16. The powertrain of claim 12 wherein said electric motor is a three-phase motor.

17. The powertrain of claim 12 wherein said transition module varies operation between said first control module and said second control module base on the speed of the electric motor.

18. The powertrain of claim 12 wherein the electric motor includes an interior permanent magnet rotor.

19. The powertrain of claim 18 further comprising a rotor angular position estimation module in said controller to determine the polarity of said interior permanent magnet rotor of the electric motor in a static condition.

* * * * *